United States Patent [19]

Lacher

[11] Patent Number: 4,620,813
[45] Date of Patent: Nov. 4, 1986

[54] POSITION RETAINING MECHANISM
[75] Inventor: William A. Lacher, Lansdale, Pa.
[73] Assignee: Burroughs Corporation, Detroit, Mich.
[21] Appl. No.: 658,796
[22] Filed: Oct. 9, 1984
[51] Int. Cl.[4] .................. F16C 11/00; F16D 11/06
[52] U.S. Cl. ........................................ 403/93; 403/90;
403/84; 403/122; 403/142; 248/181; 248/288.5
[58] Field of Search ............... 403/90, 142, 84, 122,
403/93, 147–149, 141; 248/181, 288.5, 288.3

[56] References Cited

U.S. PATENT DOCUMENTS

| | | | |
|---|---|---|---|
| 483,311 | 9/1892 | Remaly | 403/142 X |
| 620,684 | 3/1899 | Vanevera | 403/84 |
| 778,977 | 1/1905 | Johnson | 403/147 X |
| 892,105 | 6/1908 | White | 248/288.5 X |
| 973,319 | 10/1910 | Thunen et al. | 248/288.5 X |
| 993,757 | 5/1911 | Chrysler | 403/149 X |
| 1,147,844 | 7/1915 | Brice | 403/142 X |
| 1,280,013 | 9/1918 | Goddard | 248/288.5 X |
| 1,777,003 | 9/1930 | Kollath | 248/288.5 X |
| 2,121,525 | 6/1938 | Johnson | 248/288.5 X |
| 2,128,046 | 8/1938 | Heil | 248/181 |
| 3,841,769 | 10/1974 | Bowerman | 403/90 |

FOREIGN PATENT DOCUMENTS

| | | | |
|---|---|---|---|
| 22472 | 5/1935 | Australia | 403/90 |
| 145952 | 7/1920 | United Kingdom | 403/142 |

*Primary Examiner*—Thomas F. Callaghan
*Assistant Examiner*—Todd G. Williams
*Attorney, Agent, or Firm*—Francis A. Varallo; Kevin R. Peterson

[57] ABSTRACT

The present disclosure describes a mechanism for positioning a pair of members in slip-free, adjustable, angular relationships. In accomplishing the foregoing, an assembly is provided which comprises a sphere and a pair of pivotally mounted jaw-like sections for engaging the latter. The inner surfaces of the sections have substantially the same radius of curvature as the sphere surface. Additionally, the sphere surface and the inner surfaces of the jaw-like sections are configured in respective interlocking patterns. Manipulation of the jaw-like sections allows the members to be placed in the desired angular position with respect to each other—which position is maintained by virtue of the aforementioned interlocking nature of the contiguous surfaces.

5 Claims, 3 Drawing Figures

POSITION RETAINING MECHANISM

BACKGROUND OF THE INVENTION

It is often necessary to position one member with respect to another at a given angle and to maintain such orientation. Numerous applications, spanning diverse fields of technology exist for such an arrangement. For example, position retaining mechanisms are used in lighting fixtures associated with work stations and drafting boards. Also, they are used in document holders for word processors, printed circuit board jigs for component assembly and inspection, camera tripods, and automobile rearview mirrors.

Present day adjustable position retaining devices generally utilize a ball and socket assembly in which the adjustment of the members coupled respectively thereto and their retention is a function of frictional forces. In some cases, the socket has a split configuration and pressure applied thereto by a screw tightened at high torque levels brings the socket surface into closer contact with the ball. It is apparent that any desired orientation of the members must overcome the friction between contiguous surfaces of the ball and socket which tends to resist such motion. After repeated reorientation of the members, wear and material fatigue require that additional pressure be applied to the socket in order to retain a selected member orientation, particularly when one of the members is supporting a substantial load. Ultimately, regardless of the torque applied to the pressure screw, no further increase in the frictional forces are possible, and the desired angular position of the members cannot be maintained.

In view of the universality of position retaining mechanisms, the need exists for a device which will permit repetitive changes in angular position with minimal pressure on the assembly parts. Moreover, the selected position should be capable of being held indefinitely and not be dependent upon frictional forces. The mechanism of the present invention fills such a need.

SUMMARY OF THE INVENTION

In accordance with the present invention, there is provided a position retaining assembly comprised of a sphere and a pair of pivotally mounted jaw-like sections. More specifically, the inner surface of the latter sections have substantially the same radius of curvature as that of the sphere surface and are adapted to engage the latter during the operation thereof. The sphere surface and the inner surfaces of the jaw-like sections are configured in respective interlocking patterns. The members to be postioned with respect to each other are coupled respectively to the sphere and jaw-like sections. When the latter are opened slightly, the sphere may be rotated to achieve the desired angular relationship and when closed, the relationship is maintained due to the interlocking nature of the contiguous surfaces of the assembly.

More specifically, in one operative embodiment, the sphere is provided with regularly spaced indentations over its entire surface and the inner surface of the jaw-like sections have a plurality of protrusions homologously disposed with respect to a group of indentations of the sphere and adapted to be seated therein. When the jaw-like sections are opened, the protrusions will be released from the original indentations and may therefore be moved to any other combination of indentations. The release is accomplished with minimal manual pressure applied to the jaw-like sections and without the transfer of any force to the sphere. When the jaw-like sections are closed upon the sphere, the member positions will be held indefinitely. Preferably, the jaw-like sections are spring-loaded to return to a closed position automatically upon their release.

In a second embodiment of the mechanism of the present invention, the sphere is formed with a plurality of regularly spaced protrusions, and the inner surfaces of the jaw-like sections include homologously disposed indentations or apertures for receiving the protrusions. The operation of the mechanism is the same as that described hereinbefore.

It is a significant feature of the present invention that the mechanism is not dependent upon frictional forces between the sphere and jaw-like sections. Accordingly, changes in member angular position are accomplished with little or no force exerted by the latter parts on each other, thereby minimizing wear and fatigue, and insuring long life. Other features and advantages of the present invention will become apparent in the detailed description thereof which follows.

DESCRIPTION OF THE PREFERRED EMBODIMENTS

Figure 1:
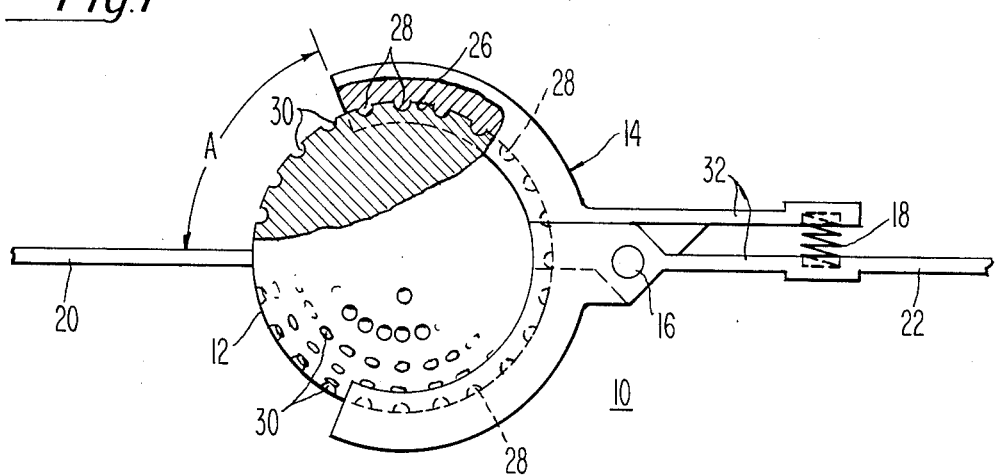
FIG. 1 is a side view of one embodiment of the position retaining mechanism of the present invention.
Figure 2:
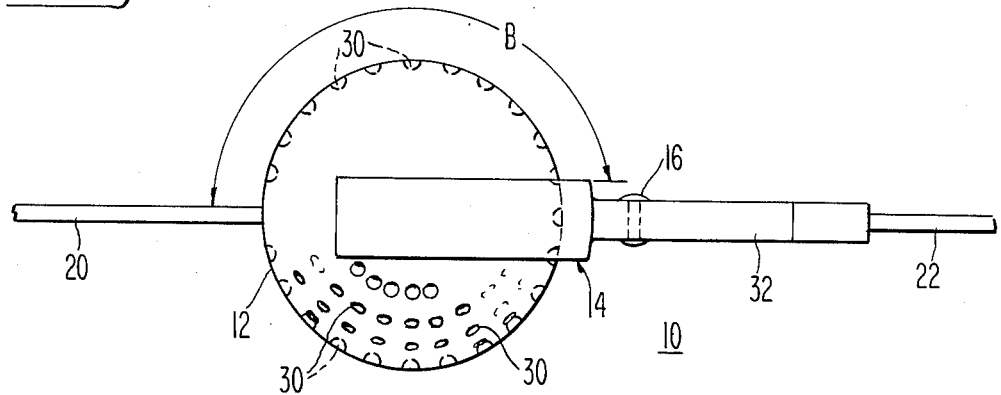
FIG. 2 is a top view of the embodiment of the invention depicted in FIG. 1.

With reference to FIGS. 1 and 2, there are illustrated respective side and top views of an embodiment of the position retaining mechanism 10 of the present invention. Mechanism 10 is an assembly comprised of a ball or sphere 12 and a pair of jaw-like sections 14 disposed in a common plane and having a generally C-shaped configuration. The sections 14 are pivotally mounted about pin 16 and spring loaded to a closed condition by spring 18. The members 20 and 22 which are to be angularly disposed with respect to each other are coupled respectively to the sphere 12 and jaw-like sections 14. As will be considered in more detail hereinafter, in order to maximize the degree of freedom in the adjustment of the members 20 and 22 relative to each other, each of the sections 14 is narrow in width compared to its length.

Substantially the entire surface of sphere 12 is indented with regularly spaced, round, cup-like apertures 30. The inner surfaces 26 of jaw-like sections 14 have the same radius of curvature as that of the sphere 12. The surfaces 26 include a plurality of protrusions 28 which have a generally hemispherical shape and are homologously arranged with respect to a like number of apertures 30. The protrusions 28 are adapted to be seated within respective apertures 30 when the jaw-like sections 14 are closed.

Figure 3:
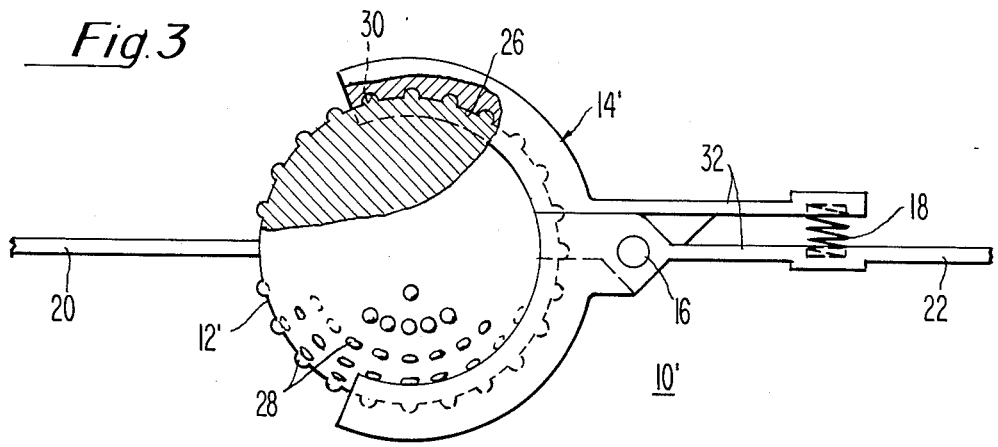
FIG. 3 is a side view of another embodiment of the present invention.

In FIG. 3, there is illustrated a side view of another embodiment of the invention. The mechanism 10' functions in the same manner as that depicted in FIGS. 1 and 2. It differs from the latter only in that the surface of the sphere 12' is formed with protrusions 28 and the inner surfaces of the jaw-like sections 14' contain apertures 30 to accommodate the former.

With reference to FIG. 1, the setting of the angular relationship of members 20 and 22 is accomplished as follows. The extensions 32 of jaw-like sections 14 are manually pressed toward each other in opposition to spring 18, thereby opening the sections 14 and permitting the protrusions 28 to exit the mating apertures 30 in which they were originally seated. Sphere 12 is then free to rotate within the jaw-like sections 14 and members 20 and 22 may be oriented with respect to each other as desired. When the extensions 32 are released, jaw-like sections 14 close and the protrusions 28 enter a new set of apertures 30—the members 20 and 22 being locked into this position indefinitely until a new position is provided in the manner described hereinbefore. The embodiment of FIG. 3 is set in like manner.

As to the actual positions which may be assumed by the members 20 and 22 relative to each other, reference to FIGS. 1 and 2 indicates the following. Assuming that member 20 is moved with respect to member 22, which remains fixed along a horizontal axis, the maximum excursion of the former in one direction within a vertical plane is defined by the angle "A". Thus, as seen in FIG. 1, the range of movement in a vertical plane is a function of the length of each of the sections 14. Obviously, for greater movement, angle "A" should be as large as practicable. The maximum excursion in one direction in a horizontal plane is defined by angle "B". As is apparent in FIG. 2, the narrow width of each of the jaw-like sections 14 permits maximum adjustment in a horizontal plane transverse to the common plane of sections 14. Member 20 may be oriented with respect to member 22 throughout an excursion which in the example of FIG. 2 is approximately 340 degrees. In practice, the angular relationship of the members 20 and 22 is a function of both horizontal and vertical components and the degree of movement is a function of the dimensions of each of the sections 14. The spacing of the protrusions 28 with respect to each other (as well as the corresponding spacing of the apertures 30) determines the minimum angular change possible during orientation of the members. Closely spaced interlocking elements provide a finer degree of adjustment. It should also be observed that in applications requiring a greater freedom of movement than that provided by one of the present mechanisms, a plurality of like mechanisms coupled in serial fashion may be utilized.

In conclusion, there has been disclosed a position retaining mechanism which is a direct replacement for present day friction-type devices, is capable of retaining a set position indefinitely, and is relatively free of wear and fatigue with repetitive use. Depending upon stress and loading considerations, the mechanism may be made from metals or plastics. Changes and modifications in the mechanism which are within the skill of the mechanical designer may be required to suit specific needs. Such changes and modifications, insofar as they are not departures from the true scope of the invention, are intended to be covered by the claims which follow.

What is claimed is:

1. A mechanism for setting and retaining the position of at least a pair of members comprising:

a sphere, one of said members being coupled thereto, a pair of jaw-like sections pivotally mounted with respect to each other, said jaw-like sections being disposed in a common plane and having a generally C-shaped configuration, each of said jaw-like sections having a predetermined width which is narrow relative to the length thereof, the other of said pair of members being coupled to said sections, said last mentioned sections including inner surfaces having substantially the same radius of curvature as the surface of said sphere, said sphere being contained within said jaw-like sections, such that at any given time a portion of the surface area of said sphere is covered by said sections, said predetermined width of said sections providing that the remaining surface area of said sphere not covered by said sections is substantially greater than the covered area, whereby the excursions of said members relative to each other are maximized and approach a full circle in a plane transverse to said common plane, the surface of said sphere and the inner surface of said jaw-like sections being configured in respective contiguous interlocking patterns, means for opening said jaw-like sections to permit the rotation of said sphere and the corresponding setting of said pair of members to a desired position with respect to each other, said last mentioned means including a pair of extensions affixed respectively to said jaw-like sections, said extensions being spring loaded to bias said sections to a closed position about said sphere, the exertion of a manual force on said extensions in opposition to the spring bias causing said pair of jaw-like sections to pivot to an open position and to remove the spring pressure exerted by said sections on said sphere, the subsequent termination of said manual force and the closing of said jaw-like sections on said sphere providing for the retention of said desired position as effected by said interlocking patterns.

2. A mechanism as defined in claim 1 wherein said interlocking patterns include respective pluralities of regularly spaced indentations and protrusions, said protrusions being homologously disposed with respect to a like number of indentations and being seated in the latter when said jaw-like sections are in said closed position.

3. A mechanism as defined in claim 2 wherein said indentations are round, cup-like apertures and said protrusions have a substantially hemispherical shape capable of being accommodated by said apertures.

4. A mechanism as defined in claim 3 wherein said cup-like apertures are regularly spaced over substantially the entire surface of said sphere and said hemispherical protrusions are formed on said inner surfaces of said jaw-like sections.

5. A mechanism as defined in claim 3 wherein said hemispherical protrusions are regularly spaced over substantially the entire surface of said sphere, and said cup-like apertures are formed within said inner surfaces of said jaw-like sections.

* * * * *